(12) United States Patent
Lee et al.

(10) Patent No.: US 8,373,820 B2
(45) Date of Patent: Feb. 12, 2013

(54) BACKLIGHT UNIT AND LIQUID CRYSTAL DISPLAY DEVICE INCLUDING THE SAME

(75) Inventors: Sang-Hyun Lee, Incheon (KR); Dong-Hyeok Kim, Namyul-ri (KR)

(73) Assignee: LG Display Co. Ltd., Seoul (KR)

( * ) Notice: Subject to any disclaimer, the term of this patent is extended or adjusted under 35 U.S.C. 154(b) by 494 days.

(21) Appl. No.: 12/643,401

(22) Filed: Dec. 21, 2009

(65) Prior Publication Data

US 2010/0157197 A1    Jun. 24, 2010

(30) Foreign Application Priority Data

Dec. 24, 2008    (KR) .................. 10-2008-0133756

(51) Int. Cl.
*G02F 1/1335* (2006.01)

(52) U.S. Cl. .............. 349/62; 349/60; 349/65; 362/613; 362/616; 362/97.1

(58) Field of Classification Search .................... 349/62, 349/60, 65; 362/613, 616, 97.1
See application file for complete search history.

(56) References Cited

U.S. PATENT DOCUMENTS

| | | | | |
|---|---|---|---|---|
| 5,438,484 | A * | 8/1995 | Kanda et al. .................. | 362/613 |
| 6,648,486 | B2 * | 11/2003 | Harbers et al. ................ | 362/613 |
| 7,277,079 | B2 * | 10/2007 | Kobayashi et al. ........... | 345/102 |
| 7,286,193 | B2 * | 10/2007 | Yoo et al. ........................ | 349/62 |
| 2004/0076396 | A1 * | 4/2004 | Suga .............................. | 385/146 |
| 2007/0247872 | A1 * | 10/2007 | Lee et al. ....................... | 362/616 |
| 2008/0204631 | A1 * | 8/2008 | Takada ............................ | 349/65 |
| 2009/0015755 | A1 * | 1/2009 | Bang et al. ...................... | 349/65 |
| 2009/0147174 | A1 * | 6/2009 | Ha et al. .......................... | 349/58 |
| 2009/0213299 | A1 * | 8/2009 | Ito et al. ......................... | 349/65 |
| 2010/0045898 | A1 * | 2/2010 | Lee et al. ........................ | 349/65 |

* cited by examiner

*Primary Examiner* — Edward J Glick
*Assistant Examiner* — Sang Nguyen
(74) *Attorney, Agent, or Firm* — Brinks Hofer Gilson & Lione

(57) ABSTRACT

A backlight unit for a liquid crystal display device includes a reflection plate, first and second light guide plates over the reflection plate, the second light guide plate disposed between the first light guide plate and the reflection plate, wherein the first light guide plate includes first and second sections alternating with each other, and the second light guide plate includes third and fourth sections alternating with each other, the first and third sections having patterns at rear surfaces, the second and fourth sections excluding patterns, wherein the first section corresponds to the fourth section, and the second section corresponds to the third section, first and second light-emitting diode (LED) assemblies at opposite sides of the first and second light guide plates, each of the first and second LED assemblies including LEDs arranged in first and second lines, and a plurality of optical sheets over the first light guide plate, wherein the LEDs of the first lines of the first and second LED assemblies face opposite side surfaces of the first light guide plate, and the LEDs of the second lines of the first and second LED assemblies face opposite side surfaces of the second light guide plate.

18 Claims, 7 Drawing Sheets

ND LIQUID CRYSTAL
BACKLIGHT UNIT AND LIQUID CRYSTAL DISPLAY DEVICE INCLUDING THE SAME

The application claims the benefit of Korean Patent Application No. 2008-0133756 filed in Korea on Dec. 24, 2008, which is hereby incorporated by reference for all purposes as if fully set forth herein.

BACKGROUND

1. Field of the Disclosure

The disclosure relates to a liquid crystal display device, and more particularly, to a backlight unit for a liquid crystal display device having a light-emitting diode (LED) light source.

2. Discussion of the Related Art

With the progress of information technology and mobile communication technology, display devices for visually showing the information have been developed. The display devices are classified into an emissive type and a non-emissive type depending on their light emission capability. Liquid crystal display (LCD) devices are non-emissive type display devices.

LCD devices require an additional light source because the LCD devices are not self-luminescent. Therefore, a backlight unit is disposed at a rear side of a liquid crystal (LC) panel and emits light into the LC panel, whereby discernible images can be displayed.

Backlight units include cold cathode fluorescent lamps (CCFLs), external electrode fluorescent lamps (EEFLs), and light emitting diodes (LEDs) as a light source. Among these, LED lamps have been widely used due to their small sizes, low power consumption, and high reliability.

Backlight units are classified into an edge type and a direct type according to the position of a light source with respect to a display panel. In edge-type backlit units, one or a pair of lamps are disposed at one side or each of two sides of a light guide plate of a backlight unit. In direct-type backlight units, a plurality of lamps are disposed directly under a display panel.

Recently, to satisfy needs of consumers, large-sized LCD device have been actively researched and developed. The direct-type backlight units are appropriate to the large-sized LCD device for the edge-type backlight units.

FIG. 1 is a cross-sectional view illustrating a liquid crystal display (LCD) module including a direct-type backlight unit and having LEDs as a light source according to the related art.

In FIG. 1, the related art LCD module includes a liquid crystal panel 10 and a backlight unit 20. The liquid crystal panel 10 includes first and second substrates 12 and 14.

The backlight unit 20 includes a reflection plate 22, LEDs 30 arranged over the reflection plate 22, and a plurality of optical sheets 26 over the LEDs 30. The plurality of optical sheets 26 includes a diffusion sheet and a light-concentrating sheet.

Here, lights emanated from adjacent two or three LEDs 30 are overlapped and mixed with each other and then are provided to the liquid crystal panel 10 as a plane light source.

The liquid crystal panel 10 and the backlight unit 20 are modularized by the top cover 60, the support main 50 and the cover bottom 70. That is, edges of the liquid crystal panel 10 and the backlight unit 20 are surrounded by the support main 50 having a rectangular frame shape. The top cover 60 covers edges of the front surface of the liquid crystal panel 10, and the cover bottom 70 covers a rear surface of the backlight unit 20. The top cover 60 and the cover bottom 70 are combined to with the support main 50 to thereby constitute one-united body.

LCD devices have been widely used as monitors for desk-top computers and wall-mount televisions as well as monitors for laptop computers. LCD devices having a large display area and thin thickness have been researched and developed. Accordingly, trials of reducing a distance A between the LEDs 30 and the optical sheets 26 of the backlight unit 20 have been suggested and developed to provide large and thin LCD devices.

However, to provide the liquid crystal panel with a high quality plane light source from the backlight unit 20, various optical designs should be considered. Among the designs, it is important to appropriately maintain the distance A between the LEDs 30 and the optical sheets 26.

Specifically, in case of LEDs 30 emitting lights within a range of predetermined angles, lights emanated from adjacent two or three LEDs 30 are overlapped and mixed with each other and then are provided to the liquid crystal panel 10 as a plane light source. As shown in FIG. 2, when the distance A between the LEDs 30 and the optical sheets 26 is considerably short, there are hot spots corresponding to the LEDs 30, and there exist darkness areas between the LEDs 30 where the lights from the LEDs 30 are not overlapped and mixed with each other. This causes lamp mura phenomenon, and display qualities of the LCD device are lowered due to non-uniform brightness.

To solve the problem, if a distance between adjacent LEDs 30 is decreased, costs are increased due to an increase in the number of LEDs, and the power consumption is also raised.

SUMMARY

A backlight unit for a liquid crystal display device includes a reflection plate, first and second light guide plates over the reflection plate, the second light guide plate disposed between the first light guide plate and the reflection plate, wherein the first light guide plate includes first and second sections alternating with each other, and the second light guide plate includes third and fourth sections alternating with each other, the first and third sections having patterns at rear surfaces, the second and fourth sections excluding patterns, wherein the first section corresponds to the fourth section, and the second section corresponds to the third section, first and second light-emitting diode (LED) assemblies at opposite sides of the first and second light guide plates, each of the first and second LED assemblies including LEDs arranged in first and second lines, and a plurality of optical sheets over the first light guide plate, wherein the LEDs of the first lines of the first and second LED assemblies face opposite side surfaces of the first light guide plate, and the LEDs of the second lines of the first and second LED assemblies face opposite side surfaces of the second light guide plate.

In another aspect, a liquid crystal display device includes a cover bottom, a backlight unit over the cover bottom that includes a reflection plate, first and second light guide plates over the reflection plate, the second light guide plate disposed between the first light guide plate and the reflection plate, wherein the first light guide plate includes first and second sections alternating with each other, and the second light guide plate includes third and fourth sections with each other, the first and third sections having patterns at rear surfaces, the second and fourth sections excluding patterns, wherein the first section corresponds to the fourth section, and the second section corresponds to the third section, first and second light-emitting diode (LED) assemblies at opposite sides of the first and second light guide plates, each of the first and second LED assemblies including LEDs arranged in first and second lines, and a plurality of optical sheets over the first light guide plate, wherein the LEDs of the first lines of the first and second LED assemblies face opposite side surfaces of the first light guide plate, and the LEDs of the second lines of the first and second LED assemblies face opposite side surfaces of the second light guide plate, a liquid crystal panel over the plurality of optical sheets, a support main surrounding edges of the liquid crystal panel and the backlight unit, and a top cover covering edges of a front surface of the liquid crystal and combined with the support main and the cover bottom.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EXEMPLARY EMBODIMENTS

Reference will now be made in detail to an embodiment of the present invention, an example of which is illustrated in the accompanying drawings.

Figure 3:
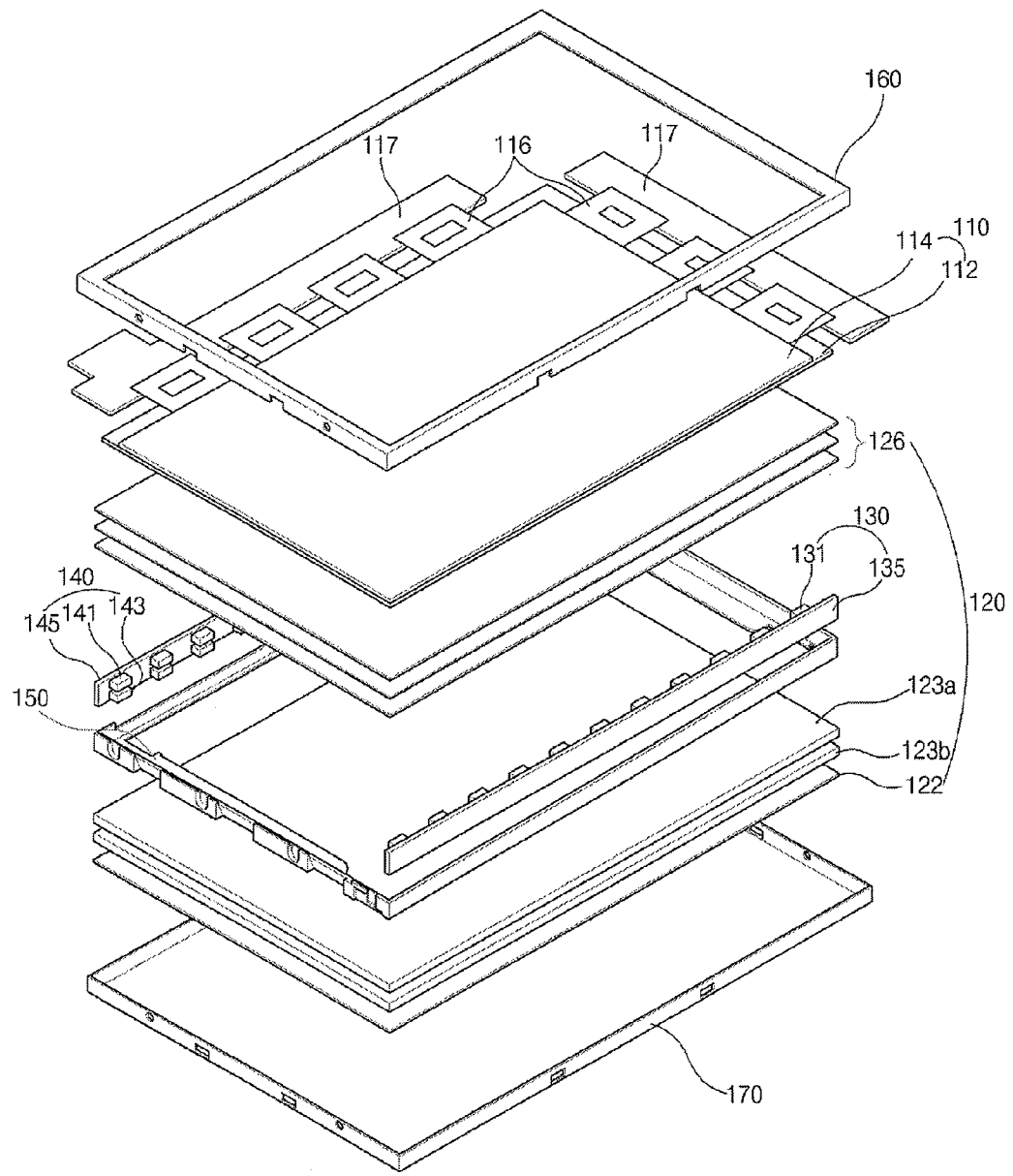
FIG. 3 is an exploded perspective view of illustrating an LCD device according to an exemplary embodiment of the present invention.

FIG. 3 is an exploded perspective view of illustrating an LCD device according to an exemplary embodiment of the present invention.

In FIG. 3, the LCD device includes a liquid crystal panel 110, a backlight unit 120, a support main 150, a top cover 160 and a cover bottom 170.

More particularly, the liquid crystal panel 110 displays images. The liquid crystal panel 110 includes first and second substrates 112 and 114 facing and attached to each other with a liquid crystal layer (not shown) interposed therebetween. In an active matrix-type, although not shown in the figure, gate lines and data lines are formed on an inner surface of the first substrate 112, which may be referred to as a lower substrate or an array substrate. The gate lines and the data lines cross each other to define pixel regions. A thin film transistor (TFT) is formed at each crossing point of the gate and data lines, and a pixel electrode is connected to the thin film transistor at each pixel region. The pixel electrode may be formed of a transparent conductive material.

A black matrix and red, green and blue color filter patterns are formed on an inner surface of the second substrate 114, which may be referred to as an upper substrate or a color filter substrate. The color filter patterns correspond to the pixel regions, respectively. The black matrix surrounds each of the color filter patterns and covers the gate lines, the data lines, and the thin film transistors. A transparent common electrode is formed over the color filter patterns and the black matrix.

A printed circuit board 117 is attached to at least one or two sides of the liquid crystal panel 110 via connecting means 116 such as flexible printed circuit boards, for example. The printed circuit board 117 is bent toward a side surface of the support main 150 or a rear surface of the cover bottom 170 during a module assembly process.

Although not shown in the figure, an alignment layer is disposed between the liquid crystal layer and each of the first and second substrates 112 and 114 to determine an initial direction of liquid crystal molecules of the liquid crystal layer. A seal pattern is formed along edge portions of the first and second substrates 112 and 114 therebetween to prevent the liquid crystal layer from leaking.

Polarizers (not shown) are attached to outer surfaces of the first and second substrates 112 and 114 and selectively transmit linearly polarized light.

The backlight unit 120 is disposed under a rear side of the liquid crystal panel 110 and provides light to the liquid crystal panel 110 so that the variances in the transmittance of the liquid crystal panel 110 are shown to the outside.

The backlight unit 120 includes a reflection plate 122 of a white or silver color, first and second light guide plates 123a and 123b over the reflection plate 122, first and second LED assemblies 130 and 140 at opposite sides of the first and second light guide plates 123a and 123b, and optical sheets 126 over the first light guide plate 123a.

The first and second LED assemblies 130 and 140 are disposed at the opposite sides of the first and second light guide plates 123a and 123b such that the first and second LED assemblies 130 and 140 face side surfaces of the first and second light guide plates 123a and 123b. Each of the first and second LED assemblies 130 and 140 includes an FPCB 135 or 145 and LEDs 131 or 141 and 143, which are spaced apart from each other and are mounted on the FPCB 135 or 145 in a double line along a length direction of the FPCB 135 or 145. Here, the LEDs 131 and 141 in a first line face opposite side surfaces of the first light guide plate 123a, and the LEDs (not shown) and 143 in a second line face opposite side surfaces of the second light guide plate 123b.

That is, lights emitted from the LEDs 131 in the first line of the first LED assembly 130 are incident on one side surface of the first light guide plate 123a, and lights emitted from the LEDs (not shown) in the second line of the first LED assembly 130 are incident on one side surface of the second light guide plate 123b. Lights emitted from the LEDs 141 in the first line of the second LED assembly are incident on another side surface of the first light guide plate 123a, and lights emitted from the LEDs 143 in the second line of the second LED assembly 140 are incident on another side surface of the second light guide plate 123b.

Each of the first and second light guide plates 123a and 123b includes the opposite side surfaces, an upper surface, which light is come out through, and a lower surface facing the reflection plate 122.

The first and second light guide plates 123a and 123b totally reflects lights emitted from the LEDs 129a several times such that the lights move through the insides of the light guide plates 123a and 123b and are uniformly scattered. Accordingly, an initial plane light source is provided to the liquid crystal panel 110.

Here, the first and second light guide plates 123a and 123b are divided into a plurality of sections, and each section separately provides the liquid crystal panel 110 with a plane light source.

Each of some sections of the first light guide plate 123a include a reflection sheet (not shown) and predetermined patterns (not shown) at its rear surface to provide the lights to the upper side. Each of some sections of the second light guide plate 123b includes predetermined patterns (not shown). The sections of the first light guide plate 123a including the predetermined patterns are alternatively arranged with the sections of the second light guide plate 123b including the predetermined patterns. This will be described in more detail later.

The reflection plate 122 is disposed under a rear surface of the second light guide plates 123b. The reflection plate 122 reflects lights passing through the rear surface of the second light guide plate 123b toward the liquid crystal panel 110 to increase the brightness.

The optical sheets 126 over the first light guide plate 123a include a diffuser sheet and at least a light-concentrating sheet. The diffuser sheet disposed over the first light guide plate 123a diffuses lights passing through the light guide plates 123a and 123b and controls the direction of the lights such that the lights go toward the light-concentrating sheet. The light-concentrating sheet concentrates the lights diffused by the diffuser sheet on the direction of the liquid crystal panel 110. Accordingly, most lights passing through the light-concentrating sheet advance perpendicularly to the liquid panel 110.

Although not shown in the figure, a diffuser plate may be disposed between the first light guide plate 123a and the diffuser sheet. The diffuser plate may have various haze properties depending on the desired light uniformity. Haze values of the diffuser plate may be determined by a light-diffusing means such as beads 123a included in the diffuser plate or fine patterns formed at a lower surface of the diffuser plate without the beads. Here, the beads disperse lights incident on the diffusion plate and prevent lights from being partially concentrated. The diffusion plate without the beads controls scattering angles of lights according to shapes of the fine patterns. Therefore, lights are prevented from being locally concentrated.

The liquid crystal panel 110 and the backlight unit 120 are modularized with the top cover 160, the support main 150 and the cover bottom 170. The top cover 160 has a rectangular frame shape with an L-shaped cross-section to cover edges of a front surface and side surfaces of the liquid crystal panel 110. A front surface of the top cover 160 has an opening, wherein images of the liquid crystal panel 110 are displayed through the opening.

The cover bottom 170, which the liquid crystal panel 110 and the backlight unit 120 are disposed over and which is a base of the liquid crystal display module, has a rectangular plate shape. Four edges of the cover bottom 170 may be bent perpendicularly toward the liquid crystal panel 110. Thus, the cover bottom 150 may include a bottom wall and four side walls. Alternatively, opposite edges of the cover bottom 170 of a length direction, which is the direction of a length of the cover bottom 170 longer than a width of the cover bottom 170, may be bent on a slant with respect to the bottom wall.

The support main 150 is disposed over the cover bottom 170. The support main 150 has a rectangular frame shape and surrounds edges of the liquid crystal panel 110 and the backlight unit 120. The support main 150 is combined with the top cover 160 and the cover bottom 170.

The top cover 160 may be referred to as a case top or a top case, the support main 150 may be referred to as a guide panel, a main support or a mold frame, and the cover bottom 170 may be referred to as a bottom cover.

Figure 4:
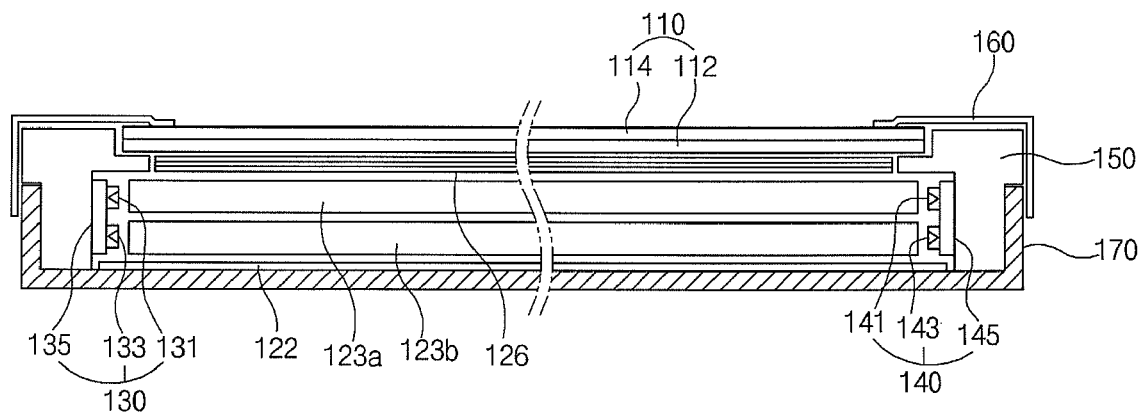
FIG. 4 is a cross-sectional view illustrating an LCD module according to an embodiment of the present invention.

FIG. 4 is a cross-sectional view illustrating an LCD module according to the present invention.

In FIG. 4, the reflection plate 122, the first and second light guide plates 123a and 123b, the first and second LED assemblies 130 and 140 at the opposite sides of the first and second light guide plates 123a and 123b, and the optical sheets 126 over the first light guide plate 123a constitute the backlight unit.

Each of the first and second LED assemblies 130 and 140 includes the FPCB 135 or 145 and the LEDs 131 and 133 or 141 and 143, which are spaced apart from each other and are mounted on the FPCB 135 or 145 in a double line along a length direction of the FPCB 135 or 145. That is, in the first LED assembly 130, the LEDs 131 and 133 are arranged in a double line on the FPCB 135. In the second LED assembly 140, the LEDs 141 and 143 are arranged in a double line on the FPCB 145. The first and second LED assemblies 130 and 140 may be attached and fixed by an adhesive material.

The LEDs 131 of the first LED assembly 130 and the LEDs 141 of the second LED assembly 140 in a first line face opposite sides of the first light guide plate 123a, and the LEDs 133 of the first LED assembly 130 and the LEDs 143 of the second LED assembly 140 in a second line face opposite sides of the second light guide plate 123b.

In other words, lights emitted from the LEDs 131 in the first line of the first LED assembly 130 are incident on one side surface of the first light guide plate 123a, and lights emitted from the LEDs 133 in the second line of the first LED assembly 130 are incident on one side surface of the second light guide plate 123b. Lights emitted from the LEDs 141 in the first line of the second LED assembly are incident on another side surface of the first light guide plate 123a, and lights emitted from the LEDs 143 in the second line of the second LED assembly 140 are incident on another side surface of the second light guide plate 123b.

Like this, since the first and second LED assemblies 130 and 140 are disposed at the opposite sides of the first and second light guide plates 123a and 123b, lights emitted from the LEDs 131, 133, 141 and 143 of the first and second LED assemblies 130 and 140 move through the insides of the light guide plates 123a and 123b and are uniformly scattered.

The liquid crystal panel 110 is disposed over the backlight unit. The liquid crystal panel 110 includes the first and second substrates 112 and 114 and the liquid crystal layer (not shown) interposed therebetween. Polarizers (not shown) are attached at outer surfaces of the first and second substrates 112 and 114 and selectively transmit polarized lights.

The edges of the liquid crystal panel 110 and the backlight unit are surrounded by the support main 150. The top cover 160 covers the edges of the front surface of the liquid crystal panel 110, and the cover bottom 170 covers the rear surface of the backlight unit. The top cover 160 is combined with the support main 150 and the cover bottom 170.

Figure 1:
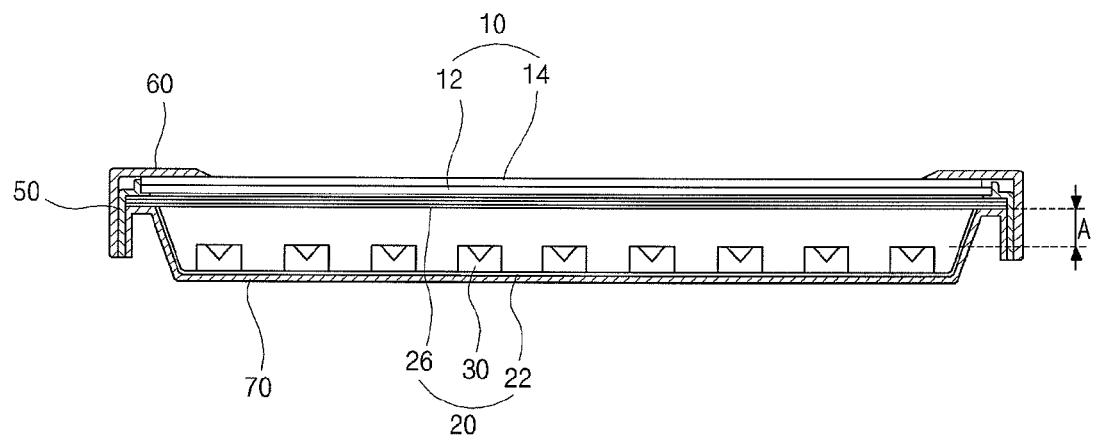
FIG. 1 is a cross-sectional view illustrating an LCD module including a direct-type backlight unit and having LEDs as a light source according to the related art.
Figure 2:
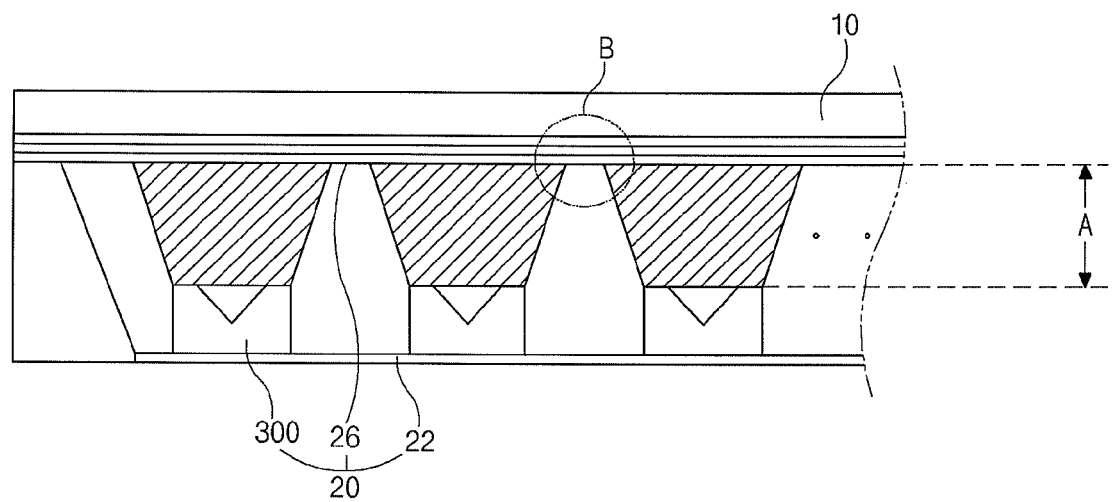
FIG. 2 is a view of schematically illustrating a range of predetermined angles of lights emanated from the LEDs of FIG. 1.

Accordingly, in the present invention, a uniform plane light source can be provided to the large-sized LCD device. In addition, the backlight unit according to the present invention can be manufactured easily and can have relatively a thin thickness and low power consumption as compared to the direct type, in which a plurality of LEDs 30 of FIG. 1 are arranged under the optical sheets 26. Moreover, the lamp mura phenomenon can be prevented, and an LCD device having uniform brightness and improved image qualities can be provided.

Particularly, according to the backlight unit of the present invention, more vivid images can be displayed, and the power consumption can be further reduced. This will be described with reference to FIG. 5.

Figure 5:
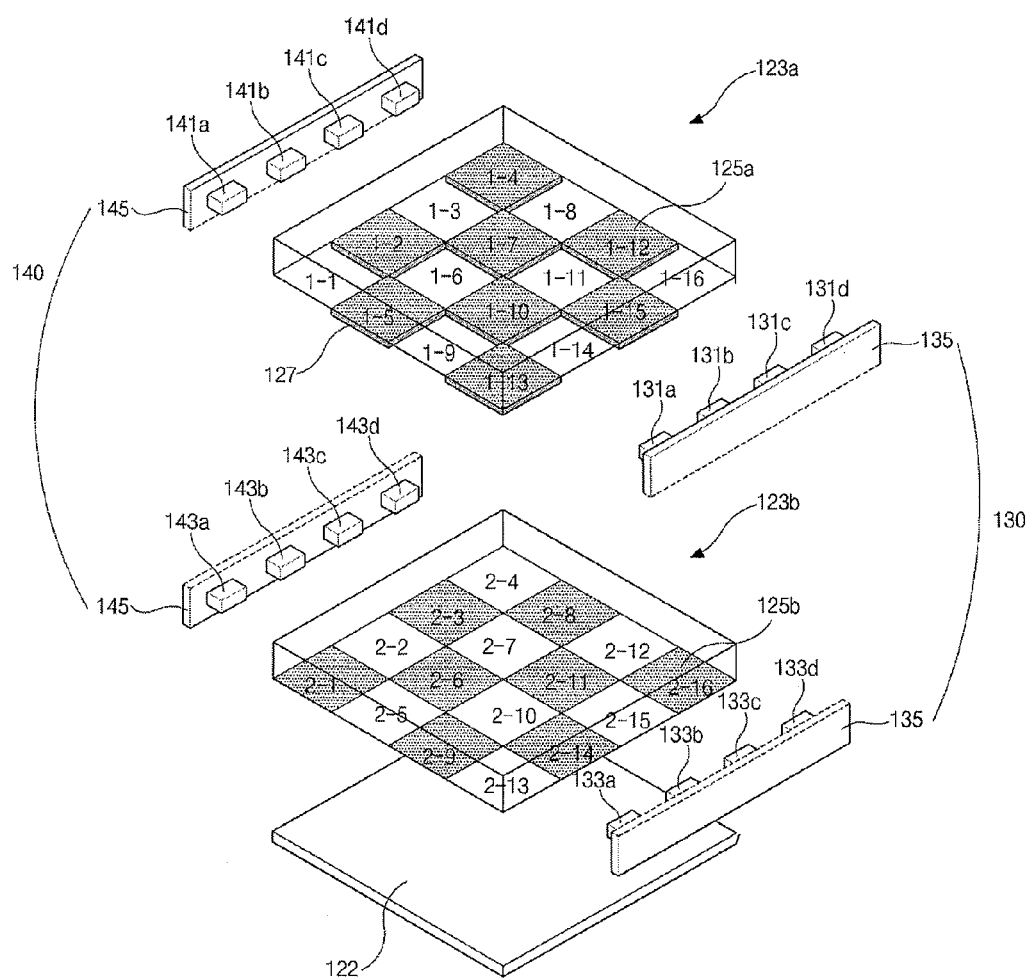
FIG. 5 is a perspective view of a backlight unit according to an embodiment of the present invention.

FIG. 5 is a perspective view of a backlight unit according to the present invention.

In FIG. 5, the backlight unit includes a reflection plate 122, first and second light guide plates 123a and 123b, and first and second LED assemblies 130 and 140. The reflection plate 122 is disposed over the cover bottom 170 of FIG. 4 and is white- or silver-colored. The first and second LED assemblies 130 and 140 are arranged at opposite edges of the reflection plate 122 along a length direction, which is a direction of a length of the reflection plate 122 longer than a width of the reflection plate 122. Each of the first and second LED assemblies 130 and 140 includes an FPCB 135 or 145 and LEDs 131 and 133 or 141 and 143 mounted on the FPCB 135 or 145 in a double line along the length direction. The first and second light guide plates 123a and 123b are disposed over the reflection plate 122 and on the same plane as the first and second LED assemblies 130 and 140 such that opposite sides of the first and second light guide plates 123a and 123b face the first and second LED assemblies 130 and 140.

More particularly, the LEDs 131a, 131b, 131c and 131d of the first line of the first LED assembly 130 face one side surface of the first light guide plate 123a. The LEDs 133a, 133b, 133c and 133d of the second line of the first LED assembly 130 face one side surface of the second light guide plate 123b. The LEDs 141a, 141b, 141c and 141d of the first line of the second LED assembly 140 face another side surface of the first light guide plate 123a opposite to the one side surface of the first light guide plate 123a. The LEDs 143a, 143b, 143c and 143d of the second line of the second LED assembly 140 face another side surface of the second light guide plate 123b opposite to the one side surface of the second light guide plate 123b.

Accordingly, lights emitted from the LEDs 131a, 131b, 131c and 131d of the first line of the first LED assembly 130 are incident on the one side surface of the first light guide plate 123a. Lights emitted from the LEDs 133a, 133b, 133c and 133d of the second line of the first LED assembly 130 are incident on the one side surface of the second light guide plate 123b. Lights emitted from the LEDs 141a, 141b, 141c and 141d of the first line of the second LED assembly 140 are incident on the another side surface of the first light guide plate 123a. Lights emitted from the LEDs 143a, 143b, 143c and 143d of the second line of the second LED assembly 140 are incident on the another side surface of the second light guide plate 123b.

The first and second light guide plates 123a and 123b may be formed of a transparent material for transmitting light, more particularly, a plastic material such as polymethyl-methacrylate (PMMA) or polycarbonate and may have a flat type. PMMA, as an acrylic resin, has properties of superior light transmission, high resistance to weathering and easy tinting and causes diffusion of light when the light passes therethrough.

Meanwhile, the first and second light guide plates 123a and 123b are divided into sections. Predetermined patterns 125a and 125b are formed at lower surfaces of some sections of the first and second light guide plates 123a and 123b to transmit lights, which come in the light guide plates 123a and 123b through the sides of the light guide plates 123a and 123b, toward the liquid crystal panel 110 of FIG. 4.

That is, the first light guide plate 123a includes first sections with patterns 125a at the lower surface and second section without patterns. The first sections and the second sections alternate with each other. The second light guide plate 123b includes third sections with patterns 125b at the lower surface and fourth sections without patterns. The third sections and the fourth sections alternate with each other.

Particularly, the first, second, third and fourth sections are arranged such that the patterns 125a and 125b of the first and second light guide plates 123a and 123b are not overlapped with each other. Accordingly, the first sections of the first light guide plate 123a with the patterns 125a correspond to the fourth sections of the second light guide plate 123b without the patterns, and the second sections of the first light guide plate 123a without the patterns correspond to the third sections of the second light guide plate 123b with the patterns 125b. That is, the first sections are disposed directly over the fourth sections, and the second sections are disposed directly over the third sections.

In addition, a reflection sheet 127 is formed at a rear surface of the first sections of the light guide plate 123a with the patterns 125a. The reflection sheet 127 prevents lights totally reflected in the first light guide plate 123a from interfering inside the second light guide plate 123b.

Here, to guide the lights incident on the inside of the light guide plates 123a and 123b, the patterns 125a and 125b may be elliptical patterns, polygonal patterns or hologram patterns. The patterns 125a and 125b may be prism patterns or lenticular patterns. The patterns 125a and 125b may be formed by a printing method or an injecting method.

Therefore, a uniform plane light source can be provided to substantially an entire surface of the liquid crystal panel 110 of FIG. 4 by the first and second light guide plates 123a and 123b or can be provided to only desired portions of the liquid crystal panel 110 of FIG. 4.

More particularly, the first and second light guide plates 123a and 123b are divided into 16 sections of 4 by 4, for example.

Each of the first and second lines of the first and second LED assemblies 130 and 140 includes four LEDs 131a, 131b, 131c, 131d, 133a, 133b, 133c, 133d, 141a, 141b, 141c, 141d, 143a, 143b, 143c and 143d. Lights emitted from the LEDs 131a, 131b, 131c, 131d, 141a, 141b, 141c and 141d on the first lines are incident on four areas through the opposite sides of the first light guide plate 123a. Lights emitted from the LEDs 133a, 133b, 133c, 133d, 143a, 143b, 143c and 143d on the second lines are incident on four areas through the opposite sides of the second light guide plate 123b.

Among the sixteen sections of the first light guide plate 123a, the sections 1-2, 1-4, 1-5, 1-7, 1-10, 1-12, 1-13 and 1-15 have the patterns 125a at the lower surface. Among the sixteen sections of the second light guide plate 123b, the sections 2-1, 2-3, 2-6, 2-8, 2-9, 2-11, 2-14 and 2-16 have the patterns 125b at the lower surface.

Figure 6:
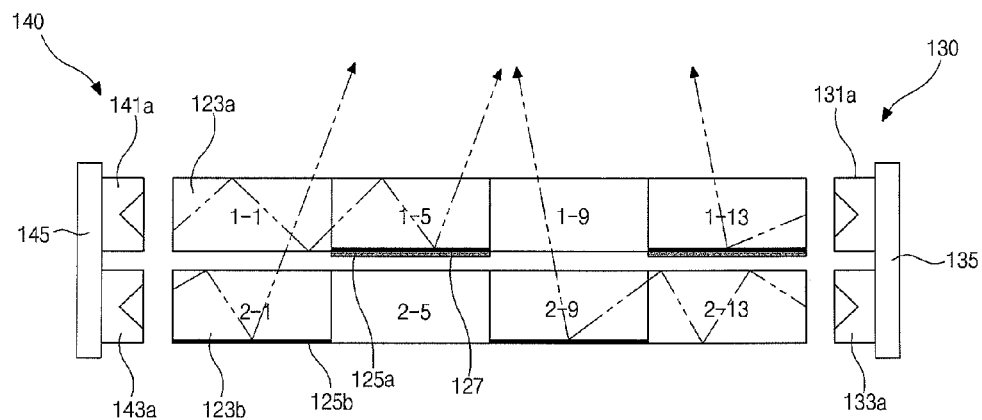
FIG. 6 is a view of schematically illustrating progress of lights emitted from the LEDs in a backlight unit according to an embodiment of the present invention.

As shown in FIG. 6, the lights, which are emitted from the first LED 131a of the first line of the first LED assembly 130 and incident on the one side surface of the first light guide plate 123a, are totally reflected and guided by the patterns 125a and the reflection sheet 127 formed in the section 1-13 of the first light guide plate 123a to be refracted toward the liquid crystal panel 110 of FIG. 4. The lights, which are emitted from the first LED 133a of the second line of the first LED assembly 130 and incident on the one side surface of the second light guide plate 123b, move inside the sections 2-13 and 2-9 of the second light guide plate 123b due to total reflection and are guided by the patterns 125b formed in the section 2-9 to be refracted toward the liquid crystal panel 110 of FIG. 4.

The lights, which are emitted from the first LED 141a of the first line of the second LED assembly 140 and incident on the another side surface of the first light guide plate 123a, move inside the sections 1-1 and 1-5 of the first light guide plate 123a due to total reflection and are guided by the patterns 125a and the reflection sheet 127 formed in the section 1-5 to be refracted toward the liquid crystal panel 110 of FIG. 4. The lights, which are emitted from the first LED 143a of the second line of the second LED assembly 140 and incident on the another side surface of the second light guide plate 123b, are totally reflected and guided by the patterns 125b formed in the section 2-1 of the second light guide plate 123b to be refracted toward the liquid crystal panel 110 of FIG. 4.

The sections 1-2, 1-4, 1-7, 1-10, 1-12 and 1-15 of the first light guide plate 123a and the sections 2-3, 2-6, 2-8, 2-11, 2-14 and 2-16 of the second light guide plate 123b guide lights emitted from the LEDs 131a, 131b, 131c, 131d, 133a, 133b, 133c, 133d, 141a, 141b, 141c, 141d, 143a, 143b, 143c and 143d and refract the lights toward the liquid crystal panel 110 of FIG. 4 in the same way.

To provide a uniform plane light source to the liquid crystal panel 110 of FIG. 4, all the LEDs 131a, 131b, 131c, 131d, 133a, 133b, 133c, 133d, 141a, 141b, 141c, 141d, 143a, 143b, 143c and 143d of the first and second LED assemblies 130 and 140 emit lights, and the lights are refracted in all the sections of the first and second light guide plates 123a and 123b.

Accordingly, the uniform plane light source can be provided to a large-sized LCD device. In addition, the backlight unit can be manufactured easily and can have relatively a thin thickness and low power consumption as compared with the direct type, in which a plurality of LEDs 30 of FIG. 1 are arranged under the optical sheets 26. Moreover, the lamp mura phenomenon can be prevented, and an LCD device having uniform brightness and improved image qualities can be provided.

Particularly, since the backlight unit of the present invention can provide lights to the liquid crystal panel 110 of FIG. 4 by the sections of the first and second light guide plates 123a and 123b, a bright image is further lit up by increasing the brightness of the bright image, and a dark image is further dimmed out by decreasing the brightness of the dark image, whereby the contrast ratio can be improved.

Thus, more vivid images can be displayed.

Moreover, the brightness appropriate to the image can be controlled such that the dark image may have the dark light, and the power consumption can be reduced.

Here, the lights, which are refracted toward the liquid crystal panel 110 of FIG. 4 in the sections of the first light guide plate 123a including the patterns 125a, are prevented from interfering inside the second light guide plate 123b by the reflection sheet 127. The lights, which are totally reflected in the sections of the second light guide plate 123b excluding the patterns, are prevented from interfering inside the sections of the first light guide plate 123a including the patterns 125a.

Accordingly, the lights can be more clearly provided to the liquid crystal panel 110 of FIG. 4 by the section.

The optical sheets 126 of FIG. 4 are disposed over the first light guide plate 123a. The optical sheets 126 of FIG. 4 include a diffuser sheet and at least a light-concentrating sheet.

In the meantime, when the lights respectively emitted from the first LED assembly 130 and the second LED assembly 140 are incident on the opposite sides of the light guide plates 123a and 123b and are totally reflected in the light guide plates 123a and 123b, a side reflection sheet may be further formed between adjacent sections such that the lights are not overlapped. More particularly, in FIG. 7, the side reflection sheet 129 is further formed between the sections 1-5 and 1-9, between the sections 1-6 and 1-10, between the sections 1-7 and 1-11, between the sections 1-8 and 1-12, between the sections 2-5 and 2-9, between the sections 2-6 and 2-10, between the sections 2-7 and 2-11, and between the sections 2-8 and 2-12.

Figure 7:
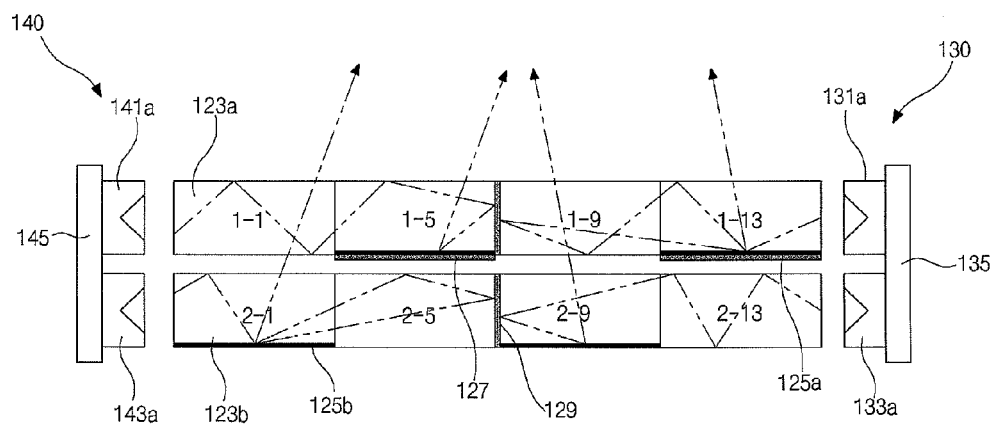
FIG. 7 is a view of schematically illustrating progress of lights emitted from the LEDs in a backlight unit according to another embodiment of the present invention.

Accordingly, as shown in FIG. 7, the lights, which are emitted from the first LED 131a of the first line of the first LED assembly 130 and incident on the one side surface of the first light guide plate 123a, move inside the sections 1-13 and 1-9 due to total reflection, and the lights are reflected by the side reflection sheet 129 between the sections 1-5 and 1-9 and guided by the patterns 125a and the reflection sheet 127 formed in the section 1-13 of the first light guide plate 123a to be refracted toward the liquid crystal panel 110 of FIG. 4.

The lights, which are emitted from the first LED 133a of the second line of the first LED assembly 130 and incident on the one side surface of the second light guide plate 123b, move inside the sections 2-13 and 2-9 of the second light guide plate 123b due to total reflection, and the lights are reflected by the side reflection sheet 129 between the sections 2-5 and 2-9 and guided by the patterns 125b formed in the section 2-9 to be refracted toward the liquid crystal panel 110 of FIG. 4.

The lights, which are emitted from the first LED 141a of the first line of the second LED assembly 140 and incident on the another side surface of the first light guide plate 123a, move inside the sections 1-1 and 1-5 of the first light guide plate 123a due to total reflection, and the lights are reflected by the side reflection sheet 129 between the sections 1-5 and 1-9 and guided by the patterns 125a and the reflection sheet 127 formed in the section 1-5 to be refracted toward the liquid crystal panel 110 of FIG. 4.

The lights, which are emitted from the first LED 143a of the second line of the second LED assembly 140 and incident on the another side surface of the second light guide plate 123b, move inside the sections 2-1 and 2-5, and the lights are reflected by the side reflection sheet 129 between the sections 2-5 and 2-9 and guided by the patterns 125b formed in the section 2-1 of the second light guide plate 123b to be refracted toward the liquid crystal panel 110 of FIG. 4.

The sections 1-2, 1-4, 1-7, 1-10, 1-12 and 1-15 of the first light guide plate 123a and the sections 2-3, 2-6, 2-8, 2-11, 2-14 and 2-16 of the second light guide plate 123b guide the lights emitted from the LEDs 131a, 131b, 131c, 131d, 133a, 133b, 133c, 133d, 141a, 141b, 141c, 141d, 143a, 143b, 143c and 143d and refract the lights toward the liquid crystal panel 110 of FIG. 4 in the same way.

Therefore, when the lights respectively emitted from the first LED assembly 130 and the second LED assembly 140 are incident on the opposite sides of the light guide plates 123a and 123b and are totally reflected in the light guide plates 123a and 123b, the lights are not overlapped.

FIGS. 8A to 8D are views showing simulation results of the brightness of a backlight unit according to the present invention. FIG. 9A is a view showing a simulation result of the brightness of a backlight unit by divided sections according to the present invention, and FIG. 9B is a view showing a displayed image according to the simulation result of FIG. 9A.

Here, the first and second light guide plates 123a and 123b of FIG. 5 are divided into 16 sections of 4 by 4. Each of the first and second LED assemblies 130 and 140 of FIG. 5 includes the LEDs 131a, 131b, 131c, 131d, 133a, 133b, 133c, 133d, 141a, 141b, 141c, 141d, 143a, 143b, 143c, and 143d of FIG. 5 in a double line, wherein each line includes four LEDs. The LEDs 131a, 131b, 131c, 131d, 141a, 141b, 141c and 141d of FIG. 5 of the first line emit lights toward eight sections through one and another side surfaces of the first light guide plate 123a of FIG. 5, and the LEDs 133a, 133b, 133c, 133d, 143a, 143b, 143c and 143d of FIG. 5 of the second line emit lights toward eight sections through one and another side surfaces of the second light guide plate 123b of FIG. 5.

Figure 8A:
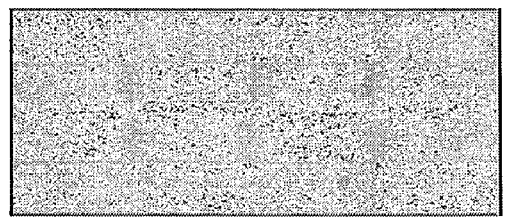
FIGS. 8A to 8D are views showing simulation results of the brightness of a backlight unit according to the present invention.
Figure 9A:
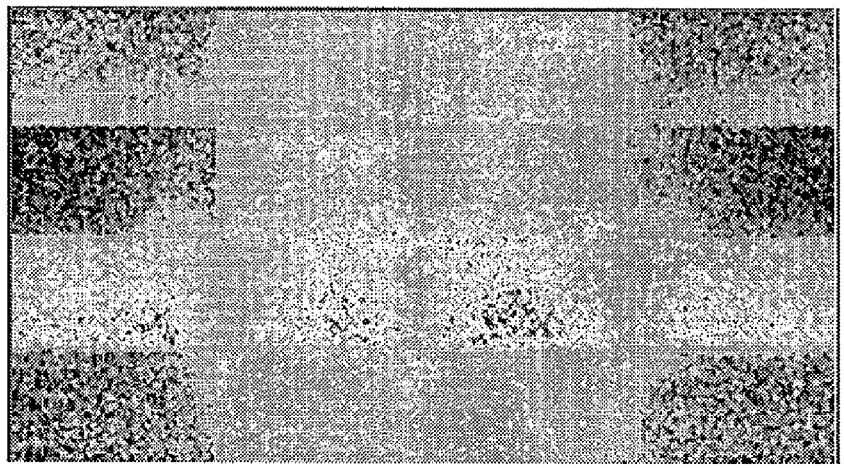
FIG. 9A is a view showing a simulation result of the brightness of a backlight unit by divided sections according to the present invention.
Figure 9B:
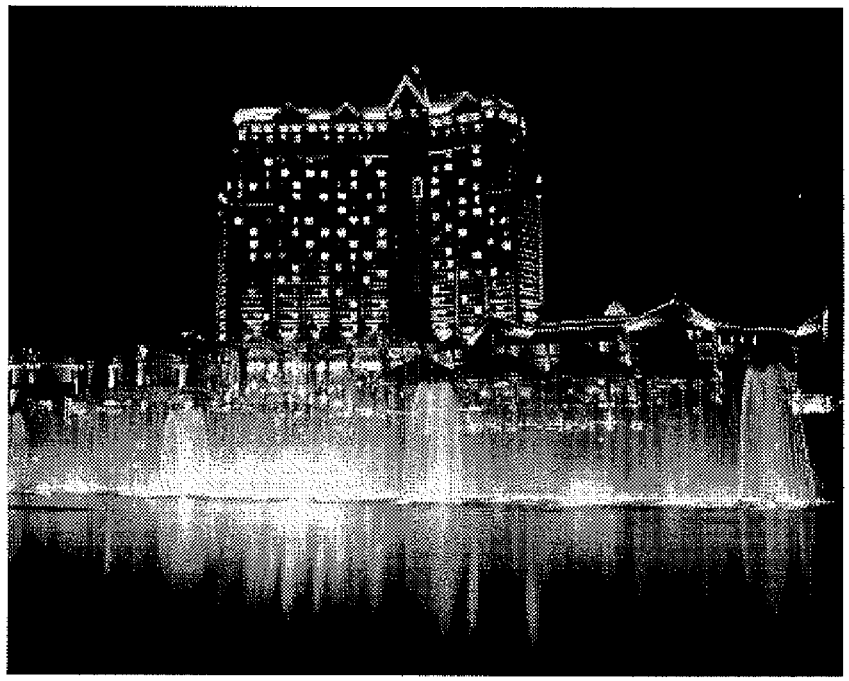
FIG. 9B is a view showing a displayed image according to the simulation result of FIG. 9A.

In FIG. 8A, all the LEDs 131a, 131b, 131c, 131d, 133a, 133b, 133c, 133d, 141a, 141b, 141c, 141d, 143a, 143b, 143c, and 143d of the first and second LED assemblies 123a and 123b of FIG. 5 emit light, and the lights are refracted in all the sections of the first and second light guide plates 123a and 123b of FIG. 5. As a result, the brightness is uniform all over the sections.

Figure 8B:
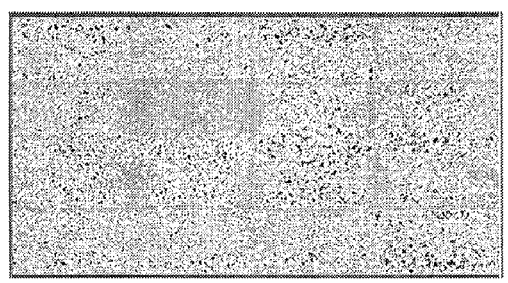
Figure 8C:
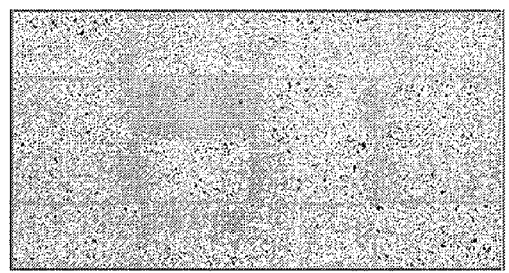
Figure 8D:
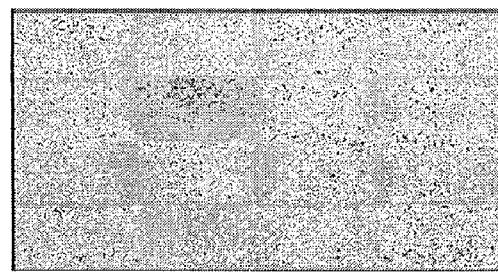

FIGS. 8B, 8C and 8D show the simulation results of the brightness of the backlight unit when luminous fluxes of 200 lm, 100 lm, and 50 lm are respectively applied to the second LED 143b of the second line of the second LED assembly 140 of FIG. 5. As show in FIGS. 8B, 8C and 8D, the brightness in the section 2-6 of second light guide plate 123b of FIG. 5 changes. Here, the brightness in the section 2-6 of the second light guide plate 123b of FIG. 5 is proportional to the luminous flux applied to the second LED 133b of FIG. 5 of the second line of the first LED assembly 130 of FIG. 5.

According to the simulation results, it is confirmed that the lights can be provided to the liquid crystal panel 110 of FIG. 4 by the sections of the first and second light guide plates 123a and 123b of FIG. 5, and the luminous flux applied to each section can also be controlled.

In FIG. 9A, the luminous flux of 100 lm is applied to the first LED 131a of FIG. 5 of the first line and the fourth LED 133d of FIG. 5 of the second line of the first LED assembly 130 of FIG. 5. The luminous flux of 200 lm is applied to the third LED 131c of FIG. 5 of the first line and the second LED 133b of FIG. 5 of the second line of the first LED assembly 130 of FIG. 5 and the second LED 141b of FIG. 5 and the third LED 141c of FIG. 5 of the first line and the second LED 143b of FIG. 5 and the third LED 143c of FIG. 5 of the second line of the second LED assembly 140 of FIG. 5. The luminous flux of 300 lm is applied to the second LED 131b of FIG. 5 and the fourth LED 131d of FIG. 5 of the first line and the first LED 133a of FIG. 5 and the fourth LED 133d of FIG. 5 of the second line of the first LED assembly 130 of FIG. 5. The luminous flux of 50 lm is applied to the first LED 141a of FIG. 5 and the fourth LED 141d of FIG. 5 of the first line and the first LED 143a of FIG. 5 and the fourth LED 143d of FIG. 5 of the second line of the second LED assembly 140 of FIG. 5.

As shown in FIG. 9A, the sections of the first and second light guide plates 123a and 123b of FIG. 5 show different brightnesses according to the luminous fluxes applied to the LEDs 131a, 131b, 131c, 131d, 133a, 133b, 133c, 133d, 141a, 141b, 141c, 141d, 143a, 143b, 143c, and 143d of FIG. 5. According to this, as shown in FIG. 9B, in the image displayed by the liquid crystal panel 110 of FIG. 4, a bright portion is further lit up by increasing the brightness of the bright portion, and a dark portion is further dimmed out by decreasing the brightness of the dark portion, whereby the contrast ratio can be improved. Therefore, more vivid images can be displayed.

Even though the backlight includes the first and second light guide plates 123a and 123b of FIG. 5, the number of the light guide plates, beneficially, is not limited according to divided sections. It is desirable that the number of the LEDs 131a, 131b, 131c, 131d, 133a, 133b, 133c, 133d, 141a, 141b, 141c, 141d, 143a, 143b, 143c, and 143d is not limited according to the divided sections of the light guide plates 123a and 123b of FIG. 5.

In the present invention, the first and second light guide plates are divided into a plurality of sections, and the first and second LED assemblies at opposite sides of the first and second light guide plates provide lights to the sections of the first and second light guide plates. Thus, the uniform plane light source can be provided to the liquid crystal panel, and the backlight unit can have a thin thickness and low power consumption.

Moreover, the lamp mura phenomenon can be prevented, and the LCD device can have the uniform brightness and improved image qualities.

Furthermore, since the lights can be provided to the liquid crystal panel separately by the sections of the first and second light guide plates, the contrast ratio of the LCD device can be improved. More vivid images can be displayed.

In addition, the power consumption can be lowered.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A backlight unit for a liquid crystal display device, comprising:
   a reflection plate;
   first and second light guide plates over the reflection plate, the second light guide plate disposed between the first light guide plate and the reflection plate, wherein the first light guide plate includes first and second sections alternating with each other along each of first and second directions perpendicular to each other, and the second light guide plate includes third and fourth sections alternating with each other along each of the first and second directions, wherein the first and third sections have patterns at rear surfaces, and the second and fourth sections are without patterns, wherein the first section corresponds to the fourth section, and the second section corresponds to the third section;
   first and second light-emitting diode (LED) assemblies at opposite sides of the first and second light guide plates, each of the first and second LED assemblies including LEDs arranged in first and second lines; and
   a plurality of optical sheets over the first light guide plate, wherein the LEDs of the first lines of the first and second LED assemblies face opposite side surfaces of the first light guide plate, and the LEDs of the second lines of the first and second LED assemblies face opposite side surfaces of the second light guide plate.

2. The backlight unit according to claim 1, wherein each of the first and second light guide plates includes the opposite side surfaces, an upper surface, which light is come out through, and a lower surface facing the reflection plate.

3. The backlight unit according to claim 1, wherein the first section of the first light guide plate further includes a reflection sheet at an outside of the rear surface.

4. The backlight unit according to claim 1, wherein each of the first and second light guide plates further includes a side reflection sheet between a region receiving light from the first LED assembly and a region receiving light from the second LED assembly.

5. The backlight unit according to claim 4, wherein the side reflection sheet of the first light guide plate is disposed between the first and second sections, and the side reflection sheet of the second light guide plate is disposed between the third and fourth sections.

6. The backlight unit according to claim 1, further comprising third and fourth light guide plates between the reflection plate and the plurality of optical sheets.

7. The backlight unit according to claim 1, further comprising third and fourth LED assemblies facing other opposite side surfaces.

8. The backlight unit according to claim 1, wherein the patterns include one of elliptical patterns, polygonal patterns, hologram patterns, prism patterns and lenticular patterns.

9. The backlight unit according to claim 1, wherein the plurality of optical sheets include a diffuser sheet and a light-concentrating sheet.

10. A liquid crystal display device, comprising:
a cover bottom;
a backlight unit over the cover bottom, the backlight unit including:
 a reflection plate;
  first and second light guide plates over the reflection plate, the second light guide plate disposed between the first light guide plate and the reflection plate, wherein the first light guide plate includes first and second sections alternating with each other along each of first and second directions perpendicular to each other, and the second light guide plate includes third and fourth sections alternating with each other along each of the first and second directions, wherein the first and third sections have patterns at rear surfaces, and the second and fourth sections are without patterns, wherein the first section corresponds to the fourth section, and the second section corresponds to the third section;
  first and second light-emitting diode (LED) assemblies at opposite sides of the first and second light guide plates, each of the first and second LED assemblies including LEDs arranged in first and second lines; and
  a plurality of optical sheets over the first light guide plate, wherein the LEDs of the first lines of the first and second LED assemblies face opposite side surfaces of the first light guide plate, and the LEDs of the second lines of the first and second LED assemblies face opposite side surfaces of the second light guide plate;
a liquid crystal panel over the plurality of optical sheets;
a support main surrounding edges of the liquid crystal panel and the backlight unit; and
a top cover covering edges of a front surface of the liquid crystal and combined with the support main and the cover bottom.

11. The device according to claim 10, wherein each of the first and second light guide plates includes the opposite side surfaces, an upper surface, which light is come out through, and a lower surface facing the reflection plate.

12. The device according to claim 10, wherein the first section of the first light guide plate further includes a reflection sheet at an outside of the rear surface.

13. The device according to claim 10, wherein each of the first and second light guide plates further includes a side reflection sheet between a region receiving light from the first LED assembly and a region receiving light from the second LED assembly.

14. The device according to claim 13, wherein the side reflection sheet of the first light guide plate is disposed between the first and second sections, and the side reflection sheet of the second light guide plate is disposed between the third and fourth sections.

15. The device according to claim 10, wherein the backlight unit further includes third and fourth light guide plates between the reflection plate and the plurality of optical sheets.

16. The device according to claim 10, wherein the backlight unit further includes third and fourth LED assemblies facing other opposite side surfaces.

17. The device according to claim 10, wherein the patterns include one of elliptical patterns, polygonal patterns, hologram patterns, prism patterns and lenticular patterns.

18. The device according to claim 10, wherein the plurality of optical sheets include a diffuser sheet and a light-concentrating sheet.

* * * * *